United States Patent
Roberts et al.

(10) Patent No.: US 6,777,823 B1
(45) Date of Patent: Aug. 17, 2004

(54) INTEGRATED CONTINUOUS POWER SYSTEM ASSEMBLIES HAVING MULTIPLE NOZZLE BLOCK SEGMENTS

(75) Inventors: Gail Roberts, Arvada, CO (US); Philip Keene, Littleton, CO (US); David Lowe, Lakewood, CO (US); James Hunt, Lakewood, CO (US); Joseph F. Pinkerton, Austin, TX (US); David B. Clifton, Leander, TX (US)

(73) Assignee: Active Power, Inc., Austin, TX (US)

( * ) Notice: Subject to any disclaimer, the term of this patent is extended or adjusted under 35 U.S.C. 154(b) by 88 days.

(21) Appl. No.: 09/861,739

(22) Filed: May 21, 2001

(51) Int. Cl.[7] ............................. H02K 7/18; F02C 7/08; F02C 6/00; F01D 15/10; F02N 11/08
(52) U.S. Cl. .................... 290/52; 290/30 R; 290/40 C; 322/10
(58) Field of Search ............................... 290/52, 30 R, 290/40 C; 322/10

(56) References Cited

U.S. PATENT DOCUMENTS

| | | | | |
|---|---|---|---|---|
| 3,948,043 A | * | 4/1976 | Martz ........................ | 290/40 R |
| 3,979,904 A | * | 9/1976 | Hobbs ....................... | 290/40 R |
| 4,035,658 A | * | 7/1977 | Diggs ........................ | 290/55 |
| 4,086,505 A | * | 4/1978 | McDonald .................. | 310/74 |
| 4,188,546 A | * | 2/1980 | Kossler ...................... | 290/52 |
| 4,434,613 A | * | 3/1984 | Stahl ......................... | 60/784 |
| 4,862,341 A | * | 8/1989 | Cook ......................... | 363/37 |
| 4,968,926 A | * | 11/1990 | Dhyanchand ............... | 322/10 |
| 4,992,721 A | * | 2/1991 | Latos ........................ | 322/10 |
| 5,012,177 A | * | 4/1991 | Dhyanchand et al. ........ | 322/10 |
| 5,068,590 A | * | 11/1991 | Glennon et al. ............. | 322/10 |
| 5,387,859 A | * | 2/1995 | Murugan et al. ............ | 322/10 |
| 5,398,571 A | * | 3/1995 | Lewis ....................... | 74/572 |
| 5,497,615 A | * | 3/1996 | Noe et al. .................. | 60/39.511 |
| 5,514,923 A | * | 5/1996 | Gossler et al. .............. | 310/74 |
| 5,686,672 A | * | 11/1997 | Klauber et al. ............. | 73/862.191 |
| 5,694,026 A | * | 12/1997 | Blanchet .................... | 322/29 |
| 5,721,461 A | * | 2/1998 | Taylor ....................... | 310/268 |
| 5,821,630 A | * | 10/1998 | Schutten .................... | 290/30 R |
| 5,831,362 A | * | 11/1998 | Chu et al. .................. | 310/90.5 |
| 6,098,584 A | * | 8/2000 | Ahner et al. ............... | 123/179.3 |
| 6,133,716 A | * | 10/2000 | Schutten .................... | 322/40 |
| 6,138,527 A | * | 10/2000 | Bitterly et al. .............. | 74/572 |
| 6,147,414 A | * | 11/2000 | McConnell et al. ......... | 290/52 |
| 6,160,336 A | * | 12/2000 | Baker et al. ................ | 310/74 |
| 6,169,332 B1 | * | 1/2001 | Taylor et al. ............... | 290/7 |
| 6,198,174 B1 | * | 3/2001 | Nims et al. ................. | 290/52 |
| 6,198,176 B1 | * | 3/2001 | Gillette ...................... | 307/64 |
| 6,202,776 B1 | * | 3/2001 | Masberg et al. ............ | 180/65.2 |
| 6,211,589 B1 | * | 4/2001 | Ahlstrom et al. ........... | 310/74 |
| 6,294,842 B1 | * | 9/2001 | Skowronski ................ | 290/7 |
| 6,307,278 B1 | * | 10/2001 | Nims et al. ................. | 290/52 |
| 6,323,625 B1 | * | 11/2001 | Bhargava ................... | 322/32 |
| 6,365,983 B1 | * | 4/2002 | Masberg et al. ............ | 290/40 C |
| 6,507,128 B2 | * | 1/2003 | King et al. ................. | 290/40 C |
| 6,598,398 B2 | * | 7/2003 | Viteri et al. ................ | 60/716 |
| 6,598,402 B2 | * | 7/2003 | Kataoka et al. ............. | 60/775 |
| 6,605,928 B2 | * | 8/2003 | Gupta et al. ................ | 322/10 |
| 6,637,183 B2 | * | 10/2003 | Viteri et al. ............... | 60/39.182 |
| 6,710,579 B2 | * | 3/2004 | Ebel et al. .................. | 322/4 |

* cited by examiner

Primary Examiner—Nicholas Ponomarenko
Assistant Examiner—Pedro J. Cuevas
(74) Attorney, Agent, or Firm—Fish & Neave; Robert W. Morris

(57) ABSTRACT

A continuous power system assembly is provided that includes an integrated shaft-driven unit. The unit contains a turbine, an alternator, a flywheel and a feed pump, all of which are coupled to the shaft. During various modes of operation, any of the turbine, alternator or flywheel may provide the torque used to drive the shaft. When the alternator is not providing the necessary torque to drive the shaft, it is operated as a generator that provides back-up power to a load. The present invention also includes a unique nozzle design that improves the ease with the nozzles may be manufactured in comparison to known designs. The nozzle is manufactured as two halves which are mated as part of the manufacturing process. The individual nozzles may, because only half of the nozzle segments exist on either half of the nozzle block, be easily manufactured using conventional machining.

8 Claims, 4 Drawing Sheets

INTEGRATED CONTINUOUS POWER SYSTEM ASSEMBLIES HAVING MULTIPLE NOZZLE BLOCK SEGMENTS

BACKGROUND OF THE INVENTION

This invention relates to continuous power systems. In particular, the present invention relates to continuous power systems that utilize a source of stored thermal energy to provide a continuous supply of electric power when a primary power supply fails, or when deterioration occurs in the power being supplied to the end user.

Continuous power systems are often used to insure that, when a primary power supply fails due to equipment malfunction, downed lines or other reasons, electric power will continue to be supplied to critical loads such as telecommunication systems, because, for example, telecommunication systems often include facilities that may be in relatively isolated locations, such as a telecommunication repeater tower. Other applications of the present invention include hospital operating room equipment, computer systems and computerized manufacturing equipment. Continuous power systems avoid equipment failures, costly downtime and equipment damage.

Known continuous power systems may employ an uninterruptible power supply (UPS) to provide alternating current (AC) power to the end user or critical load, or may use other electronic means to provide DC power to the end user or critical load.

For known continuous power systems, batteries or flywheels may be employed as energy storage subsystems to provide bridging energy while a fuel-burning engine is started. Such flywheel systems may include a flywheel connected to an electrical machine that can operate both as a motor and a generator. For example, U.S. Pat. No. 5,731, 645 describes flywheel systems that provide backup power to the load in UPS systems. The electrical machine is powered by a DC buss to operate as a motor when acceptable power is received from the primary power supply. When power from the primary power supply fails (or is degraded), the electrical machine is rotated by the kinetic energy of the flywheel and operates as a generator to supply power to the DC buss.

Continuous power systems often use prime movers (e.g., fuel-burning engines) to drive backup generators during prolonged power outages. These prime movers, however, are often costly, complicated, and may require extensive ongoing maintenance. In addition, the engines themselves may fail to start, resulting in a loss of power to the critical load. Moreover, some localities limit the running time or the number of starts per year for backup generator engines, thereby limiting the ability to test and maintain such systems.

Other energy storage systems currently used to provide backup power are often expensive and complicated. For example, in typical battery energy storage systems, there is a risk that undetected battery damage or corrosion of battery terminals can result in a failure to deliver backup power when needed. Moreover, batteries have a limited shelf life, in addition to requiring expensive ventilation, drainage, air conditioning and frequent maintenance. Flywheel energy storage systems, while avoiding most of the disadvantages of batteries, can be expensive since they are often mechanically complex and can require complicated power electronics.

Some known systems provide long-term power by driving a shaft-mounted generator with a turbine. For example, U.S. Pat. No. 6,255,743 describes an uninterruptible power supply system that includes a shaft-mounted generator and a turbine. These turbines may be open systems, where the turbine is driven by a fuel source that is regularly renewed, such as LP gas, methane, gasoline, diesel fuel. In such instances, the turbine exhaust is allowed to escape into the environment.

Typical turbine-based systems, however, often rely on many individual components that are assembled together to form the complete system. This may result in potential problems in interconnecting the components together, such as cooling and power distribution within the system. In addition, there may be a reduction in overall system efficiency and/or reliability if, for example, multiple shaft-mounted devices are each installed on their own shafts and the shafts are then coupled together by some form of linking mechanism.

The use of a turbine in a continuous power supply system may create additional problems. For example, the design and manufacturing of the turbine nozzle may be particularly important because of the need to inject a potentially limited quantity of vapor into the turbine and still drive the turbine with enough force that the spinning turbine can drive a generator fast enough to produce high quality power. This may require special tooling or other special manufacturing processes which can significantly increase the cost of manufacturing the system.

Accordingly, it is an object of the present invention to provide continuous power system assemblies that utilize integrated components.

It is another object of the present invention to provide continuous power system assemblies that utilize a common cooling system.

It is a further object of the present invention to provide continuous power system assemblies that are configured to enable relatively simple installation and maintenance.

It is a still further object of the present invention to provide continuous power system assemblies for turbine systems that include high efficiency nozzles, that can be manufactured economically.

SUMMARY OF THE INVENTION

The continuous power system assemblies of the present invention provide numerous advantages by integrating several components of the assembly into a single housing. One of the advantages of such a configuration is the improved ease of installation over conventional systems, which is particularly applicable when the continuous power systems are installed in remote locations, such as in a telecommunications site. The assemblies of the present invention include an integrated unit that contains a turbine, an alternator, a pump and a flywheel, all mounted to a single shaft in a common housing.

The turbine may be used to provide shaft-driving force during both SHORT-TERM and LONG-TERM OUTAGES of the primary power source (e.g., utility power). It should be noted that an OUTAGE, as defined herein, includes both an interruption in power from a source (such as utility power), as well as a degradation in quality of the power delivered by the source. During a SHORT-TERM OUTAGE, a source of stored thermal energy may be used to vaporize working fluid to drive the turbine. During a LONG-TERM OUTAGE, a gas-fired burner, for example, may be used to vaporize the working fluid used to drive the turbine. In that case, the turbine would continue to drive the continuous power system until utility power was restored or the fuel supplied to the burner was exhausted.

Another source of energy that may be used to drive the shaft comes in the form of kinetic energy stored by the flywheel, which is rotated at a given speed by utility power during STAND-BY mode. During a SHORT-TERM OUTAGE, the flywheel, instead of or in addition to the source of stored thermal energy, provides the force used to drive the shaft. The use of either or both sources of back-up power may depend on the specific circumstances of a given OUTAGE—one or both sources may be used to provide bridging energy until the gas-fired burner is fully operational. It is preferable to utilize the stored kinetic energy first, as it is instantly available while the thermal energy is available only after a brief delay.

During STAND-BY mode, the continuous power systems of the present invention provide utility power to the alternator (which may be a single electrical machine that is operable as both a motor and as a generator), which acts as a motor and drives the common shaft. The rotation of the shaft causes the flywheel to be spun up to its STAND-BY speed, so that it stores a given amount of kinetic energy. During all other modes of operation, the shaft is driven by another source of power and the alternator operates as a generator that provides the necessary back-up power.

An additional feature of the present invention is the inclusion of a feed pump in the integrated unit. The feed pump, which is also mounted to and driven by the common shaft pressurizes the working liquid fluid so that it can be re-vaporized and superheated. In this manner, the energy from the turbine itself is used to replenish the supply of working fluid to the turbine. For example, in a closed turbine system, the feed pump may be used to pump condensed working liquid (i.e., the exhaust of the turbine that was condensed back to liquid) to an evaporator that converts it back to liquid for injection into the turbine.

The turbine, which may be mounted at one end of the assembly, includes nozzles that direct superheated working vapor onto the turbine wheel. The nozzles, in accordance with the present invention, are configured in a convergent/divergent design, similar to a Venturi, so that the vapor is accelerating as it is injected into the turbine. This results, however, in a very narrow nozzle throat width. The nozzle block containing the nozzles, which is described in more detail below, is constructed in accordance with the principles of the present invention by placing half of the nozzles on two halves of a nozzle block which is then mated together. This permits the nozzle throats to be machined inexpensively without any special tooling, and also permits the nozzle block halves to be cast, which further reduces manufacturing costs.

BRIEF DESCRIPTION OF THE DRAWINGS

Further features of the invention, including the above and other objects, its nature and various advantages, will be more apparent upon consideration of the following detailed description, taken in conjunction with accompanying drawings, in which like reference characters refer to like parts throughout, and in which.

DETAILED DESCRIPTION OF THE DRAWINGS

Figure 1:
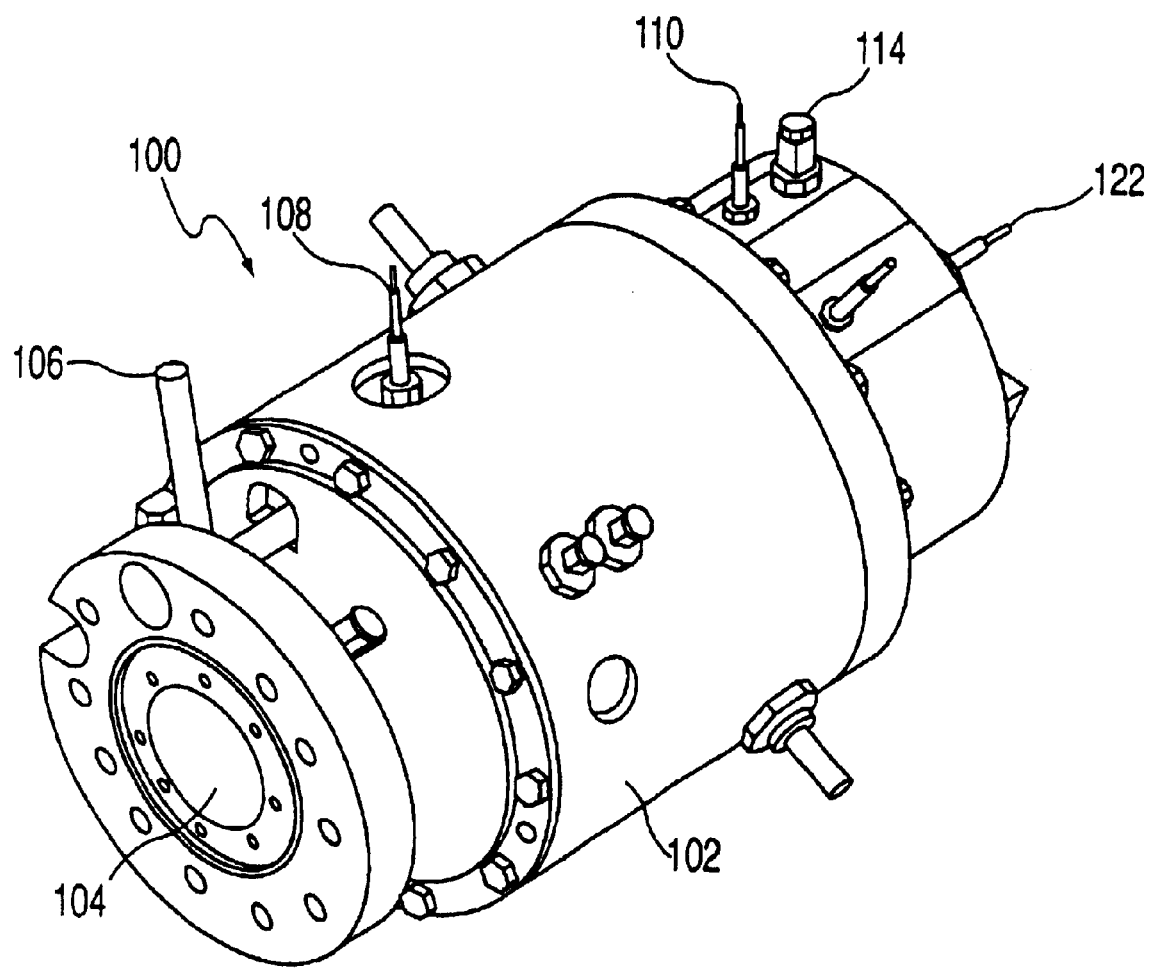
FIG. 1 is a three-dimensional perspective view of an integrated shaft-driven assembly of a continuous power system constructed in accordance with the principles of the present invention.

FIG. 1 shows three-dimensional perspective view of an integrated continuous power system shaft-driven assembly 100 constructed in accordance with the principles of the present invention. Assembly 100 includes assembly housing 102, turbine exhaust port 104, nozzle input port 106, shaft sensor 108, flywheel sensor 110, feed pump exhaust port 112 and feed pump inlet port 114. Housing 102 also includes various other ports that are not shown, such as input ports for the introduction of bearing lubricant into housing 102 and electrical control inputs to at least the alternator (see FIG. 2) that is also contained within housing 102.

Assembly housing 100 illustrates the relative ease with which a major portion of a continuous power system may be installed and/or replaced in the event of a failure. Because housing 100 is a substantially self-contained unit, installation does not require, for example, alignment and/or balancing of the flywheel or alternator. In addition, it should be noted that assembly 100 may be hermetically sealed, which would eliminate the need for rotating seals and increase reliability (by eliminating potential components that could leak or otherwise wear out over time). Installation of housing 100 may be accomplished by locating the unit in place and connecting the various input and output ports to the other equipment of the continuous power system.

Figure 2:
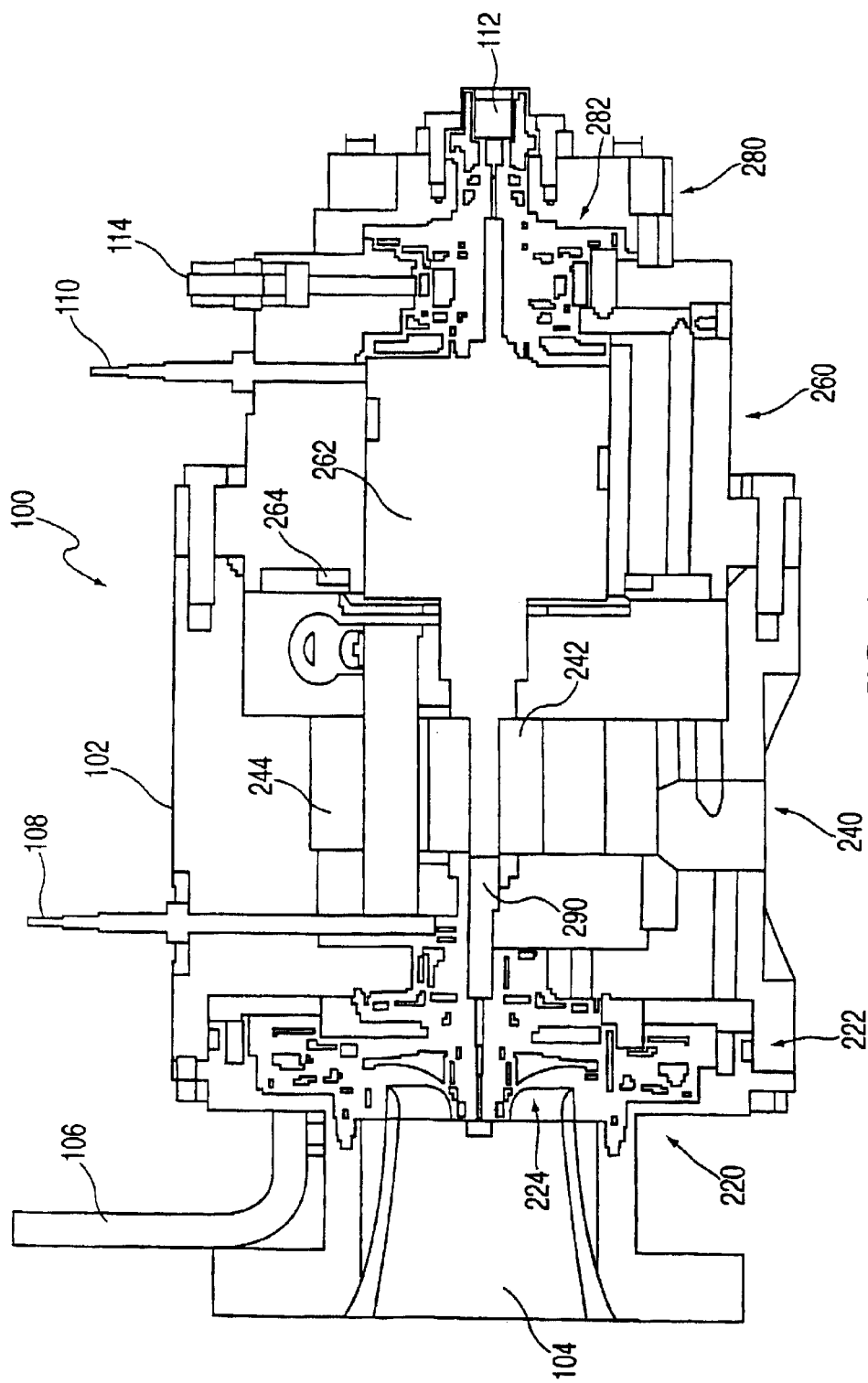
FIG. 2 is a sectional view of the integrated shaft-driven assembly of FIG. 1.

Further features of the present invention will be apparent by viewing the sectional view illustration shown in FIG. 2. In addition to the previously described components, the sectional view of FIG. 2 also shows interior portions of turbine 220, alternator 240, flywheel assembly 260 and pump assembly 280, which are all mounted to common shaft 290.

Turbine 220 includes nozzle inlet 106, nozzle block 222 (which contains a number of nozzles as described in more detail with respect to FIG. 3 below), and turbine wheel 224, which is directly connected to shaft 290. The operation of turbine 220 is well known. In general, turbine wheel 224 continues to rotate as long as shaft 290 is driven by some force (such as, for example, alternator 240). When vapor is input via input port 106 into nozzle block 222, the vapor is directed through the nozzles so that it impacts turbine wheel 224. Turbine wheel 224 is configured such that the force of the impact of the vapor drives turbine wheel 224 so that turbine 220 applies torque to shaft 290, and thereby becomes the driving force that rotates shaft 290.

Alternator 240 includes rotor 242, which is mounted to shaft 290, and stator 244, which is mounted within housing 102 such that it does not rotate, while being concentric with rotor 242. Alternator 240 is configured such that, based on control signals from a controller (not shown), alternator 240 is operable as a motor or as a generator. The connections for the control signals, as well as the terminals from which power is output during GENERATOR mode operations are not shown in FIGS. 1 and 2, but will be apparent to those skilled in the art. During normal operations, when utility power is provided to a load at the proper level and having the proper quality, utility power is provided to alternator 240 which operates as a motor that applies torque to shaft 290, thereby causing it to continue to rotate.

During any OUTAGE condition—where the supply of power from the utility falls below a predetermined quantity or quality level—control signals are sent to alternator 240 which cause it to operate as a generator, so that rotation of shaft 290 results in power being generated by alternator 240 and provided as an output to a load. This includes when shaft 290 is being driven by turbine 220, as well as when it is being driven by flywheel assembly 260.

Flywheel assembly 260 includes flywheel 262, which is integral with shaft 290, mounting brace 264, and speed sensor 110. Flywheel 262 may be formed of steel or other substance that has appropriate mechanical properties to achieve a high moment of inertia and efficiently store kinetic energy that may be used to temporarily provide back-up power to a load during an OUTAGE. When alternator 240 ceases providing torque to rotate shaft 290, the kinetic energy stored in flywheel 262 takes over, providing the necessary torque to rotate shaft 290, which causes flywheel 262 to slow down. The rotational speed of flywheel 262 is monitored by sensor 110 (a similar sensor 108 is use to monitor the rotational speed of shaft 290).

During an OUTAGE period when flywheel 262 is the active component providing torque to shaft 290, the controller monitors the rotational speed of flywheel 262 based on inputs from sensor 110. When the rotational speed falls below a certain level, the next phase of operation is triggered for the continuous power system. This may include utilizing another source of short-term back-up power, or it may entail initiating the startup process of whichever component provides the necessary torque to drive shaft 290 during LONG-TERM OUTAGES.

Pump assembly 280 includes feed pump 282, as well as pump exhaust port 112 and pump inlet port 114. Feed pump 282 is mounted to and driven by shaft 290, such that as long as shaft 290 rotates, and liquid working fluid is delivered to pump inlet port 114, pump 282 continues to operate as a pump. Feed pump 282 operates to take working fluid that has been exhausted by turbine 220, and may have been condensed by a condenser (not shown), and provide it to another continuous power system component so that the fluid is ultimately evaporated and injected back into turbine 220 to drive the turbine. Overall system reliability and efficiency is increased because of the reduced number of components that must be electrically driven.

Figure 3:
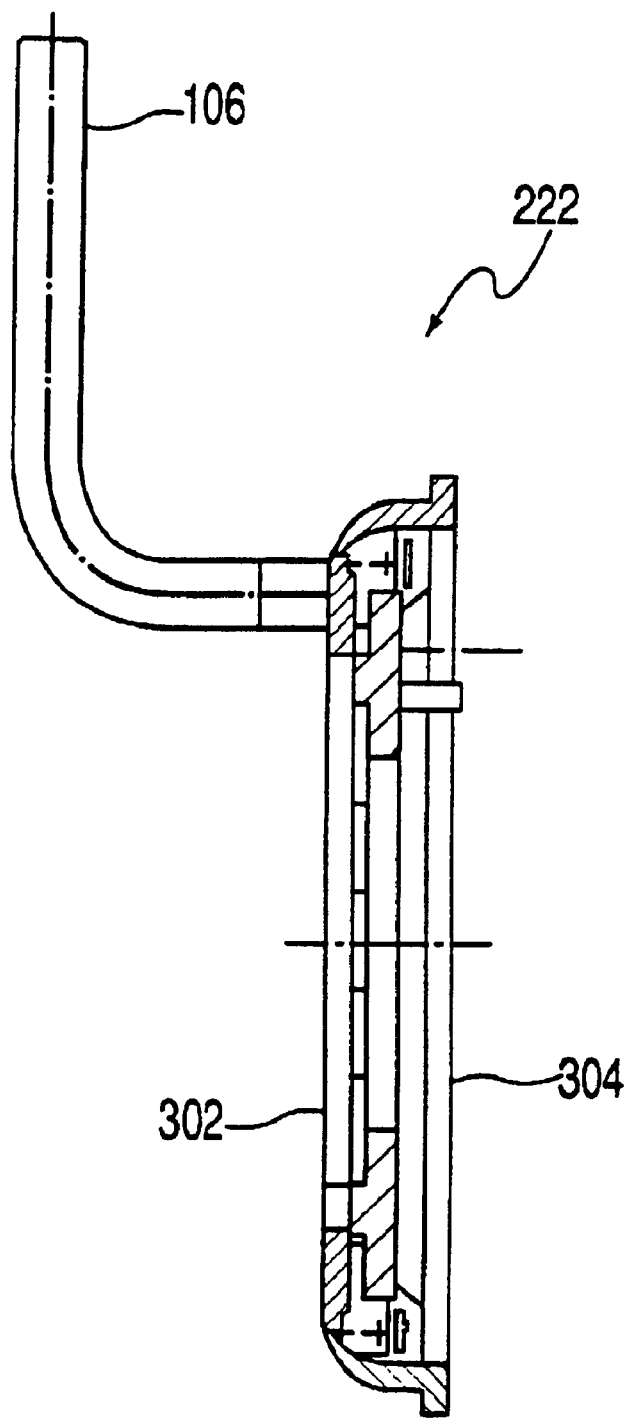
FIG. 3 is a sectional view of a turbine nozzle block of a turbine in a continuous power system constructed in accordance with the principles of the present invention.
Figure 4:
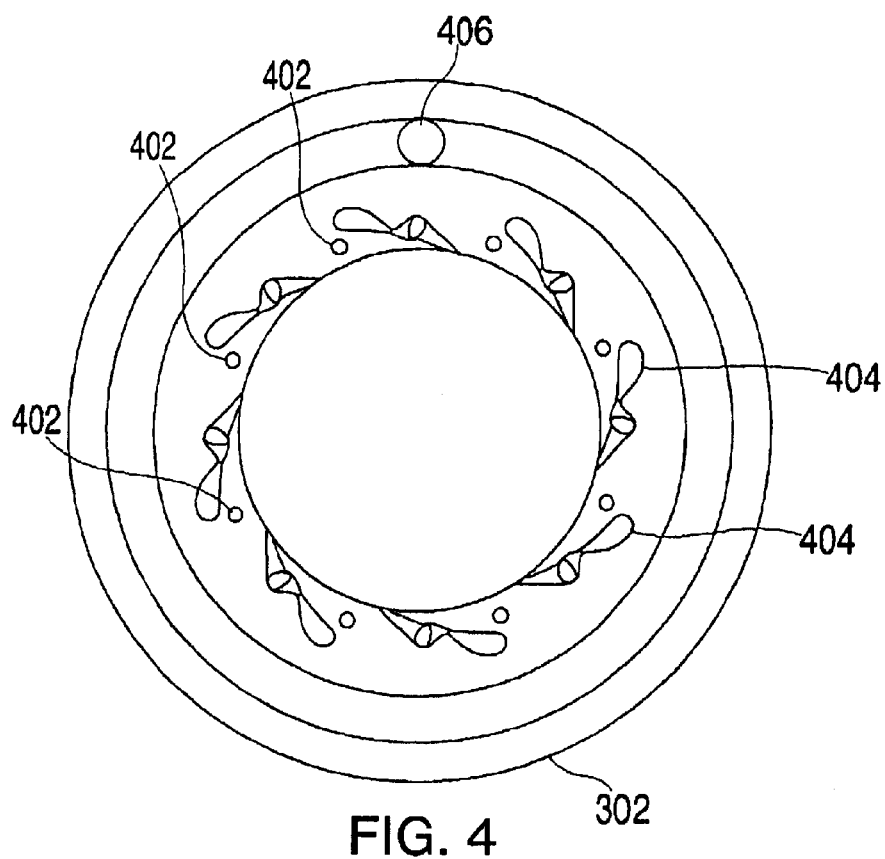
FIG. 4 is a sectional view of one half of the turbine nozzle block of FIG. 3.
Figure 5:
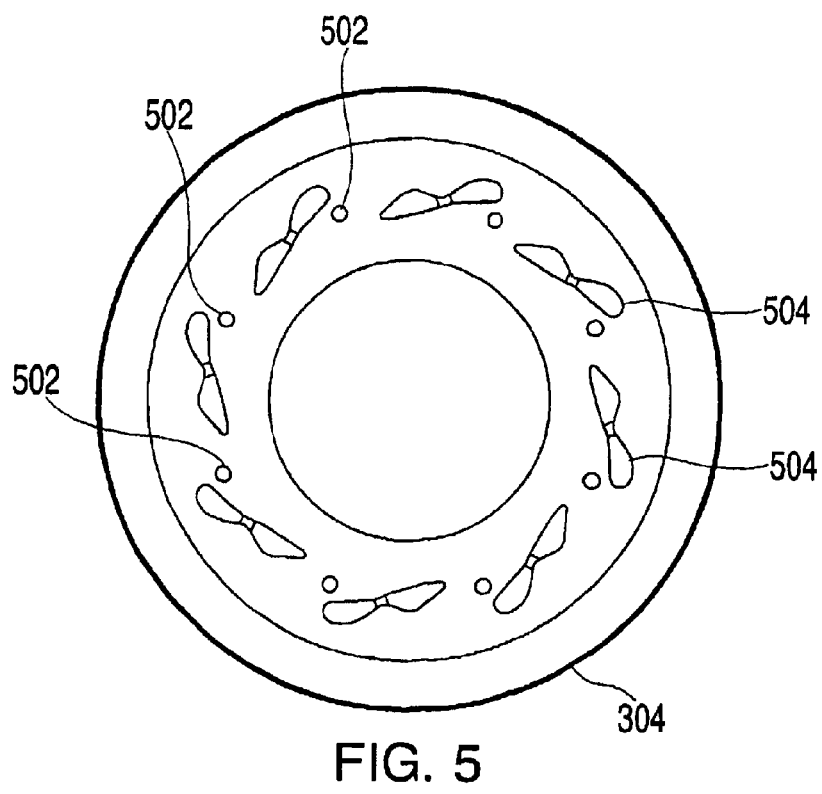
FIG. 5 is a sectional view of the other half of the turbine nozzle block of FIG. 3.

FIGS. 3–5 show various sectional views of nozzle block 222, that has been constructed in accordance with the principles of the present invention. FIG. 3, in particular, shows a completely assembled nozzle block 222, which includes upper nozzle portion 302, lower nozzle portion 304 and nozzle inlet port 106 (i.e., the tube that provides working fluid to nozzle block 222). Upper nozzle portion 302 is shown in more detail in FIG. 4, while lower nozzle portion 304 is shown in more detail in FIG. 5.

Nozzle block 222 is configured such that each nozzle (i.e., the openings in nozzle block 222 through which working fluid is directed onto turbine wheel 224) is formed in a convergent/divergent configuration (similar to a Venturi), so that the fluid must accelerate as it passes through the nozzle throat (openings 402 and 502, as shown in FIGS. 4 and 5, respectively). The convergent/divergent configuration is formed by the raised and lowered surfaces 404 and 504, which are respectively shown in FIGS. 4 and 5. Upper nozzle portion 302 also includes a hole 406 through which inlet port 106 is connected.

By fabricating nozzle block 222, in accordance with the principles of the present invention, in two halves, it becomes significantly easier to form the narrow nozzles throats. In fact, the nozzle throats may be machined without the need for any special tooling, and, each of nozzle portions and 304 may be manufactured by casting, thereby reducing manufacturing costs.

From the foregoing description, persons skilled in the art will recognize that this invention provides improved shaft-driven assemblies for use in continuous power systems. It will also be recognized that the invention may take many forms other than those disclosed in this specification. Accordingly, it is emphasized that the invention is not limited to the disclosed methods and apparatuses, but is intended to include variations to and modifications thereof which are within the spirit of the following claims.

We claim:

1. A continuous power system assembly comprising:
    a housing;
    a shaft mounted within said housing;
    a turbine comprising a turbine wheel mounted to said shaft;
    an alternator comprising a rotor mounted to said shaft and a stator mounted to said housing, said alternator operating as a motor during a first period of time and as a generator during a second period of time;
    a flywheel mounted to said shaft; and
    a feed pump mounted to said shaft such that rotation of said shaft causes said feed pump to rotate.

2. The assembly of claim 1, wherein said turbine further comprises:
    an inlet port;
    an exhaust port; and
    a nozzle block connected to said inlet port, said nozzle block comprising a plurality of nozzles that direct working fluid received from said inlet port onto said turbine wheel.

3. The assembly of claim 2, wherein said nozzle block comprises:
    an upper nozzle portion comprising approximately half of said nozzle segments in said nozzle block; and
    a lower nozzle portion comprising the remainder of said nozzle segments in said nozzle block.

4. The assembly of claim 1 further comprising:
    a shaft sensor that monitors rotational speed of said shaft.

5. The assembly of claim 1, wherein said alternator further comprises:
    a stator fixedly mounted to said housing concentric with said rotor.

6. The assembly of claim 1 further comprising:
    a flywheel sensor that monitors the rotational speed of said flywheel.

7. The assembly of claim 1 further comprising:
    an inlet port coupled to said feed pump, said feed pump being configured to receive fluid through said inlet port that has been exhausted by said turbine and condensed to liquid; and
    an exhaust port coupled to said feed pump, said feed pump providing said received fluid to another system component through said exhaust port when said shaft rotates such that said provided fluid is eventually injected back into said turbine to drive said turbine.

8. A method of providing backup power to a load in the event of an OUTAGE comprising:
    providing power from a main source to an alternator mounted to a shaft in a housing prior to said OUTAGE occurring;
    operating said alternator as a motor that applies torque to said shaft prior to said OUTAGE occurring;

spinning a flywheel connected to said shaft, said flywheel being mounted to said shaft such that said flywheel stores kinetic energy prior to said OUTAGE occurring;

driving a turbine wheel of a turbine connected to said shaft prior to said OUTAGE occurring;

operating said alternator as a generator once said OUTAGE occurs;

applying torque to said shaft from at least one of said flywheel and said turbine to cause said shaft to continue rotating; and causing a feed pump connected to said shaft to operate whenever said shaft is rotated and working fluid is introduced into said pump.

* * * * *